(12) United States Patent
Bartomeli (10) Patent No.: US 9,965,966 B2
(45) Date of Patent: May 8, 2018

(54) INSTRUCTIONS ON A WEARABLE DEVICE

(71) Applicant: SAP SE, Walldorf (DE)

(72) Inventor: Nick Bartomeli, Shelton, CT (US)

(73) Assignee: SAP SE, Walldorf (DE)

( * ) Notice: Subject to any disclaimer, the term of this patent is extended or adjusted under 35 U.S.C. 154(b) by 329 days.

(21) Appl. No.: 14/850,621

(22) Filed: Sep. 10, 2015

(65) Prior Publication Data

US 2017/0072312 A1    Mar. 16, 2017

(51) Int. Cl.
*A63F 13/5375* (2014.01)
*G09B 5/00* (2006.01)
*A63H 33/00* (2006.01)

(52) U.S. Cl.
CPC .............. *G09B 5/00* (2013.01); *A63H 33/00* (2013.01); *A63H 2200/00* (2013.01)

(58) Field of Classification Search
CPC ........ G09B 5/00; A63F 33/00; A63F 2200/00; A63H 33/00; A63H 2200/00
See application file for complete search history.

(56) References Cited

U.S. PATENT DOCUMENTS

| 4,321,045 | A | * | 3/1982 | Crowley | .................. | A63F 1/06 273/148 A |
| 5,634,095 | A | * | 5/1997 | Wang | ........................ | G06F 8/34 715/763 |
| 6,823,495 | B1 | * | 11/2004 | Vedula | ....................... | G06F 8/34 715/763 |
| 7,164,937 | B2 | * | 1/2007 | Schnurr | ................ | H04L 51/066 345/581 |
| 8,332,750 | B2 | * | 12/2012 | Banyasad | ............ | G06T 11/206 715/200 |
| 8,667,015 | B2 | * | 3/2014 | Jiao | ................... | G06F 17/30896 706/11 |
| 8,738,846 | B2 | * | 5/2014 | Son | ...................... | G06F 12/0246 711/103 |
| 8,745,039 | B2 | * | 6/2014 | Dube | ................ | G06F 17/30864 707/722 |
| 9,128,582 | B2 | * | 9/2015 | Sirpal | ................... | G06F 1/1616 |
| 9,292,306 | B2 | * | 3/2016 | Day | ....................... | G06F 9/451 |
| 9,348,919 | B2 | * | 5/2016 | Armstrong | ........ | G06F 17/30728 |
| 9,460,228 | B2 | * | 10/2016 | Greenberg | .......... | G06F 17/3089 |
| 2011/0119571 | A1 | * | 5/2011 | Decker | ............. | G06F 17/30902 715/205 |
| 2013/0054656 | A1 | * | 2/2013 | Conroy | ................. | G06F 1/1626 707/821 |

(Continued)

*Primary Examiner* — David L Lewis
*Assistant Examiner* — Matthew D. Hoel
(74) *Attorney, Agent, or Firm* — Jones Day (57) ABSTRACT

A system is configured for a developer/modeler to be able to define various steps. Each step can be a step in the installation of a product. Each step can have one or more cards. Each card corresponds to a screen which can be presented to a user and which displays various information such as an instruction, a list of items to be installed, etc. There is a sequential relationship between the steps. A first step and a last step are defined, with each step in-between having a preceding and a following step. Similarly, for each of the steps that includes more than one card, there is a sequential relationship between the cards of the respective step, which cards include a first card, a last card, and intermediate cards, each of the latter of which has a preceding card and a following card.

11 Claims, 5 Drawing Sheets

(56) References Cited

U.S. PATENT DOCUMENTS

| | | | |
|---|---|---|---|
| 2014/0337621 A1* | 11/2014 | Nakhimov | G06F 1/163 713/168 |
| 2015/0007102 A1* | 1/2015 | Choi | G06F 3/0485 715/784 |
| 2015/0186346 A1* | 7/2015 | Mesguich Havilio | G06F 3/04842 715/256 |
| 2016/0004393 A1* | 1/2016 | Faaborg | G06F 3/0482 715/765 |
| 2016/0018968 A1* | 1/2016 | Wilson | G06F 3/04842 715/763 |
| 2016/0034887 A1* | 2/2016 | Lee | G09G 5/12 705/39 |
| 2016/0188134 A1* | 6/2016 | Azmoon | G06T 11/206 715/781 |
| 2016/0232131 A1* | 8/2016 | Liu | G06F 17/211 |
| 2016/0328108 A1* | 11/2016 | Li | G06F 3/0485 |
| 2016/0342573 A1* | 11/2016 | Greenberg | G06Q 30/0643 |

* cited by examiner

INSTRUCTIONS ON A WEARABLE DEVICE

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

BACKGROUND

Assembled products are bulky, and thus, inventory and delivery of such products impose additional expenses on manufacturers and retailers. To save on such expenses, many manufacturers and retailers offer their customers products which are ready-to-assemble. Ready-to-assemble products are provided with an instruction manual and tools to assist the consumer to assemble the product. In a typical scenario, a consumer has to read the instruction manual and follow the instructions provided therein. Reading instruction manuals, however, is not limited to the context of ready-to-assemble products. For example, activities such as preparing a recipe or performing automotive maintenance can include instruction sets.

DETAILED DESCRIPTION

Following instructions provided in a manual requires paying close attention to the details, and, for a consumer to be able to read and follow the instructions as closely as possible, the consumer often has to place the instruction manual close to the parts as well as the tools. However, locating various parts or tools can be distracting for the consumer. The consumer might have to reach out to retrieve such parts and tools, which means that the consumer is not focused on the instruction manual. Such distractions can be detrimental to the consumer if the consumer is interacting with dangerous parts or tools. In such circumstances, reading and following written instructions on a printed manual can be difficult, if not impossible.

Instruction manuals were conventionally provided in paper-printed form, and more recently some manufacturers offered electronic instruction manuals viewable on personal computers and laptops with relatively large monitors. However, electronic instruction manuals are not available for wearable devices, mobile phones, and tablets (hereinafter "smart devices"). The smaller size of the screens on such devices makes it difficult for a consumer to quickly find, navigate, and understand the dense information that can be included in some instruction manuals.

Advances in computing technologies have enabled smaller devices, such as smart devices, to execute more sophisticated applications. However, until now, there are no known systems and methods that provide consumers with electronic instruction sets usable practically on their smart devices. Embodiments of the present invention provide methods and systems to enable a user to generate, display, and review complex instruction sets on smart devices.

Traditional printed instructions can turn a trivial task into a frustrating one and even create a potentially dangerous situation depending on the complexity and tools involved in the assembly. Example embodiments of the present invention provide instructions on a wearable device that is attached to the user's body and adapt an instruction application to voice, touch, or eye-tracking commands, enabling the user to maintain focus on the task at hand and finish the task in an efficient and safe manner.

In an example embodiment, an authoring environment is provided by which a modeler (user) can design an instruction model from which a user interface is generated, the latter of which is user-interactable. The designing using the authoring environment begins with defining a plurality of steps, each step including one or more cards. The cards correspond to respective screens which will be displayed to the user. Then, the modeler can use the authoring environment to create various connections between the cards. Finally, an instruction application displays the model as an electronic instruction manual on a smart device usable by users.

In an example embodiment, the system is configured for the modeler to be able to define various steps. Each step can be a step in the installation of a product. Each step can have one or more cards. Each card corresponds to a screen which can be presented to a user and which displays various information such as an instruction, a list of items to be installed, etc. There is a sequential relationship between the steps. A first step and a last step are defined. In between the first and last steps, each step has a preceding and a following step. Similarly, for each of the steps that include more than one card, there is a sequential relationship between the cards of the respective step, which cards include a first card, a last card, and intermediate cards, each of the latter of which has a preceding card and a following card.

The modeler can define one or more triggers on each card. A non-exhaustive list of example triggers includes a button, a hyperlink, a touch gesture, a voice command, and an eye-input command. A button has a defined area within the screen presented to the user and can be activated when a user presses the button, e.g., using the touchscreen of a smart device. A hyperlink is a text or picture which can be activated, e.g., when a user presses the text or picture using the touchscreen of a smart device.

A touch gesture can include performing one of the following actions on the screen of a smart device: tapping, double tapping, swiping, long pressing, long-press and dragging, double-tap dragging, pinching open, pinching closed, two finger touching, two finger swiping, two finger long-pressing, two finger long-press swiping, two finger double tapping, and two finger rotating. In an example embodiment, by default, on every card swiping is defined as a trigger. This definition can include swiping up, down, left, and right.

A voice command is defined as uttering a letter, a word, or a plurality of words by the user, which the smart device recognizes using a voice recognition module. An eye-input command is defined as a glance by either eye or a movement of either eye in a particular direction. An eye-input command can be recognized using an eye-tracking module.

The modeler can define various connections between the cards. A connection facilitates a movement between a card in a step to another card in the same step or different step. The definition of each connection includes a source card, a destination card, and a trigger. A source card is the card from which a transition can be made to another card. The destination card is the card to which the transition is made. A trigger is what activates the transition. The triggers are card specific and have been described above.

By default, a connection is defined between every card and the first card in the proceeding or following step, and the trigger is, for example, swiping left for the (first card of the) following step or swiping right for the (first card of the) preceding step. For the cards in the first step, no connection to any preceding step is defined and for the cards in the last step, no connection to any following step is defined. Similarly, by default, a connection is defined between every card and its respective following or preceding cards (e.g., of the same step) and the trigger is, for example, swiping up for the following card and swiping down for the preceding card. For the first card in a step, no connection to the preceding card is defined and for the last card in a step, no connection to the following card is defined.

The modeler can define a text-to-speech or pre-recorded playing feature for the instruction model. For example, an instruction model can include voice commands such as "read current card" for initiating a text-to-speech or pre-recorded playing of the information on the current card in the current step. Such commands can be universally defined (i.e., defined for application to every card). In some instances, this reading of a card can emphasize certain keywords in the instructions which are important for the user to become aware of. As such, reading of a card can include auditory cues as to which words are keywords by a change in pitch, brief pause, or other such mechanisms such that the user may avoid having to glance at the host device of the instruction application.

Figure 1:
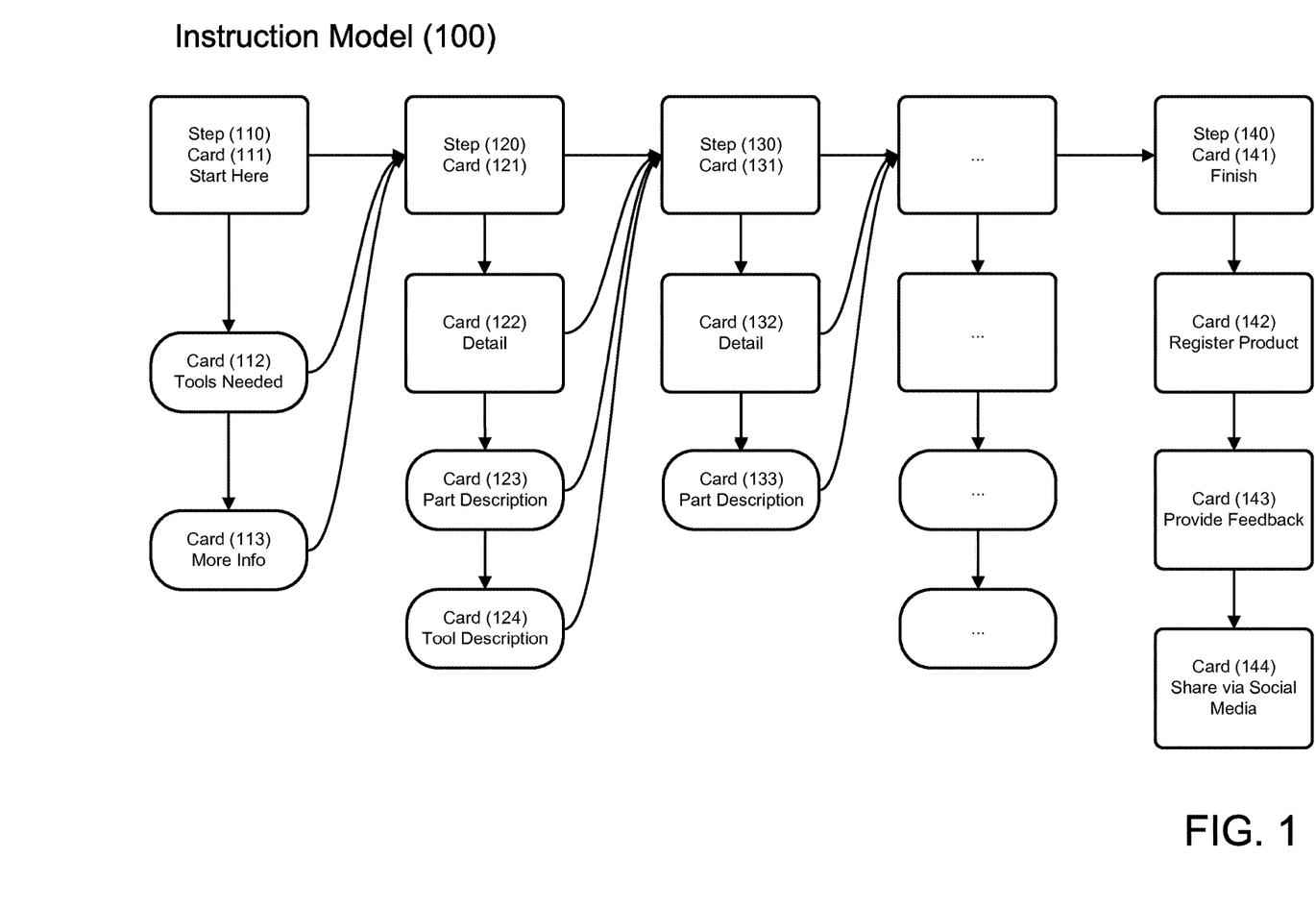
FIG. 1 illustrates an example instruction model defined in an authoring environment according to an example embodiment of the present invention.

FIG. 1 illustrates an example instruction model 100 defined in an authoring environment according to an example embodiment. The instruction model 100 includes a plurality of steps 110, 120, 130, and 140. In addition, each of steps 110, 120, 130, and 140 contains one or more cards. For example, step 110 can start at card 111. Step 110 can indicate the tools needed for assembly of a product at card 112 and additional information at card 113. Similarly, each of steps 120, 130, and 140 can include cards 121-124, 131-133, and 141-144 respectively. There is a sequential relationship between the steps 110, 120, 130, and 140. Similarly, there is a sequential relationship between the cards in each step: between 111, 112, and 113; 121, 122, 123, and 124; 131, 132, and 133; and 141, 142, 143, and 144.

The instruction model 100 also includes several defined connections between the cards. The illustrated connections are a non-exhaustive list of connections which are defined for this particular model by default. For example, in the instruction model 100 there is a sequential relationship between, and a connection is defined between, cards 111 and 112, in which card 111 is the source card and card 112 is the destination card. By default, a swipe trigger is defined such that, once the user swipes up on the screen of the user's smart device corresponding to card 111, the trigger activates for responsive display of, and navigation of the user to, the screen associated with card 112.

By default, there is also a connection between card 112, as the source card, and card 111, as the destination card. This connection is not shown on FIG. 1. Again, by default, a swipe trigger is defined on card 112. Once the user swipes down, this trigger is activated for navigation from card 112 to card 111, including display of the screen associated with card 111.

Because there is a sequential relationship between step 110 and step 120, by default, a connection is defined between each card included in step 110 and the first card included in step 120, which is card 121. Since, by default, each card in step 110 has a swipe trigger defined for it, once the user swipes to the left, while the screen corresponding to any of cards 111-113 is displayed, the user will be guided to the first card of step 120, which is card 121.

Similarly, by default, since there is a sequential relationship between step 120 and step 110, a connection is defined between each card of step 120 and the first card of the step 110. These connections are not shown on FIG. 1. Similarly, by default, each one of the cards in step 120 has a swipe trigger defined according to which, the user is displayed the screen corresponding to the first card 111 of step 110 in response to a user swipe to the right.

Figure 2:
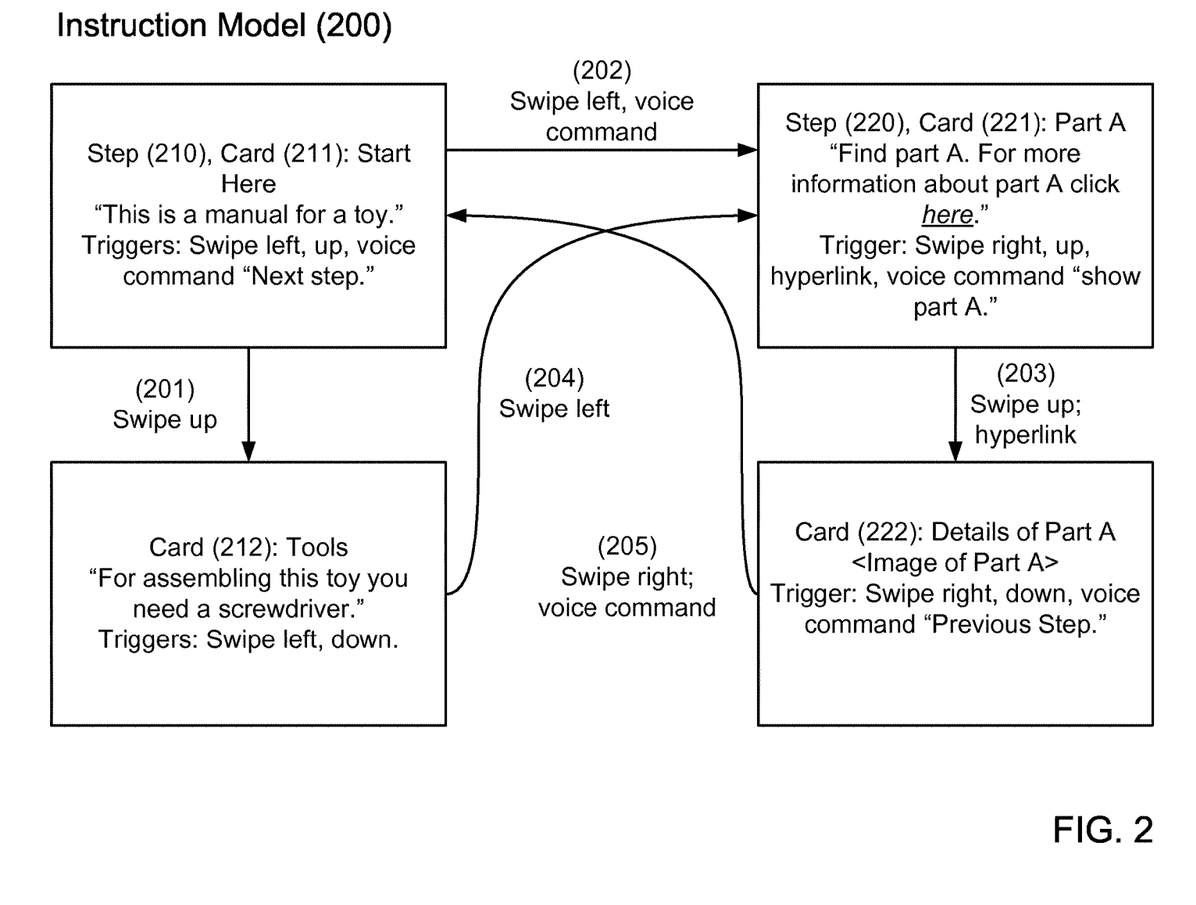
FIG. 2 illustrates an example instruction model including various triggers according to an example embodiment of the present invention.

FIG. 2 illustrates an example instruction model 200 including various triggers according to an example embodiment. In this example embodiment, the modeler can define two steps 210 and 220 in the authoring environment. Step 210 includes two cards 211 and 212. Card 211 is titled "Start Here" and includes the following text: "This is a manual for a toy." In this example embodiment, three triggers are defined for card 211 in the authoring environment. The first two triggers are swiping left and swiping up, which are defined by default. Since card 211 is the first card in step 210, and step 210 is the first step in this example instruction model, by default, no right and down swipes are defined for this card. The third trigger is a voice command which is sensitized to the words "next step."

Two connections in this example embodiment identify card 211 as the source card: connections 201 and 202. The trigger for connection 201 is swiping up, which is defined on card 211. This connection is defined by default between cards 211 and 212. The triggers for connection 202 are swiping left and the voice command "next step." The swiping left trigger is defined by default on card 211, but the voice command can be added by the modeler.

Card 212 is the last card in step 210. It is titled "Tools" and displays the following sentence: "For assembling this toy you need a screwdriver." Two triggers are defined on this card by default: swiping left and swiping down. Connection 204 can transition the user from card 212, as the source card, to card 221, as the destination card. By default, another connection also is defined for card 212, which has card 212 as the source card, and card 211 as the destination card. The trigger for this connection is swiping down. For simplicity, this connection is not shown in FIG. 2.

Card 221 is the first card in step 220, which is the last step of instruction model 200. Card 221 is titled "Part A," and displays the text "Find part A. For more information about part A click here." By default, two triggers can be defined for card 221, which are swiping up and swiping right. A hyperlink trigger can also be defined for card 221. This hyperlink is imbedded in the text of card 221.

By default, a connection is defined between card 221 and card 222, which is the last card in step 220. The trigger for this connection is swiping up. A modeler can also include the hyperlink of card 221 in the definition of the connection 203 and enable the user to transition to card 222 by pressing the hyperlink (i.e., the word here). Another connection is also defined for card 221, which can navigate the user to card 211 upon swiping right. However, for simplicity, this connection is not shown in FIG. 2.

Card 222 is the last card in step 220. It is titled "Details of Part A" and displays an image of part A. Several triggers are defined on this page, which triggers include swiping right and down, and a voice command. In connection 205, card 222 can be defined as its source card and card 211 can be defined as its destination card. A modeler can define swiping right and a voice command as the triggers for the connection, where, upon activation of either trigger, the user will be navigated to card 211. By default, a connection is defined between card 222, as the source card, and card 221, as the destination card, which is not shown in FIG. 2.

Figure 3:
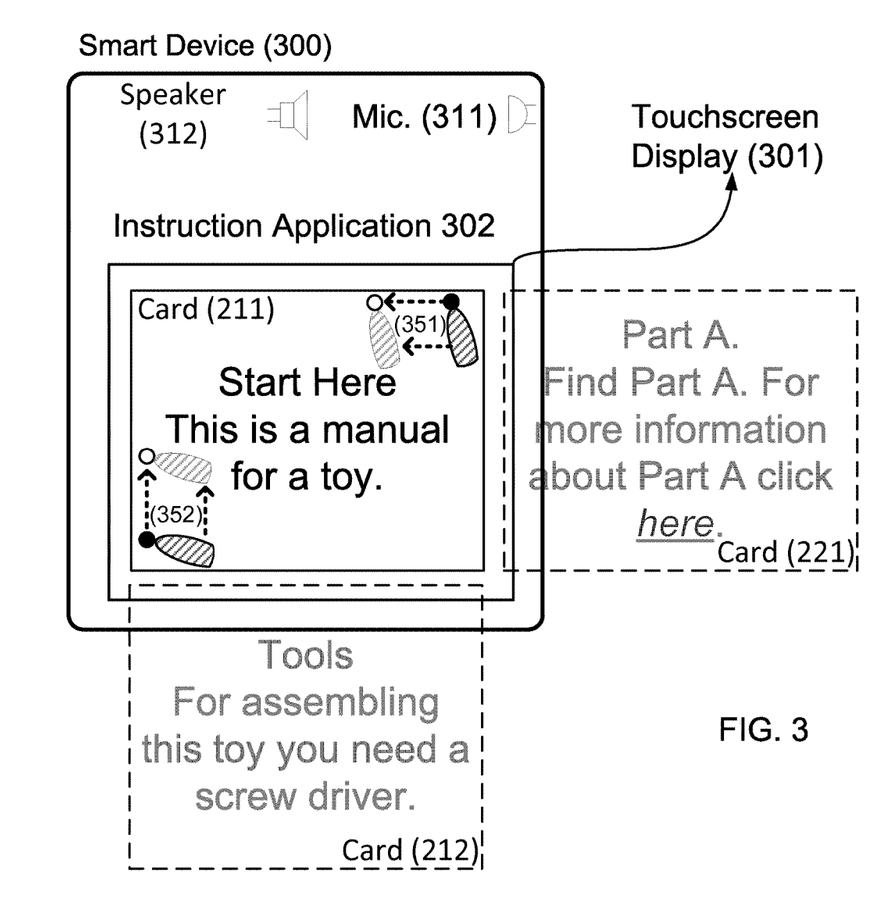
FIG. 3 illustrates an example embodiment of a smart device displaying an instruction application in accordance with an example embodiment of the present invention.

FIG. 3 illustrates an example embodiment of a smart device displaying screens of an instruction application in accordance with an example embodiment. Smart device 300 includes various input/output devices by which to interact with a user, e.g., providing output to or receiving commands from the user. For example, the electronic device 300 can include a touchscreen display 301 for displaying screens of instruction application 302. By touching the screen of display 301, the user can command the smart device 300. The smart device 300 also can include microphone 311 as an input device to receive voice commands from the user, and speaker 312 as an output device to provide a speech output of the content of a card being displayed to the user.

The instruction application 302 can display card 211. Card 211 includes a title "Start Here" and reads "This is a manual for a toy." The user can make a touch gesture 351, which represents swiping left. If the user swipes left, connection 202 activates and in response instruction application 302 displays card 221. The user can also utter "Next Step" to achieve the same result, where, upon recognizing the words uttered by the user, the instruction application 302 navigates the user to card 221. The user can also make a touch gesture 352, which represents swiping up. If the user swipes up, connection 201 activates and in response application 302 displays card 212.

Figure 4:
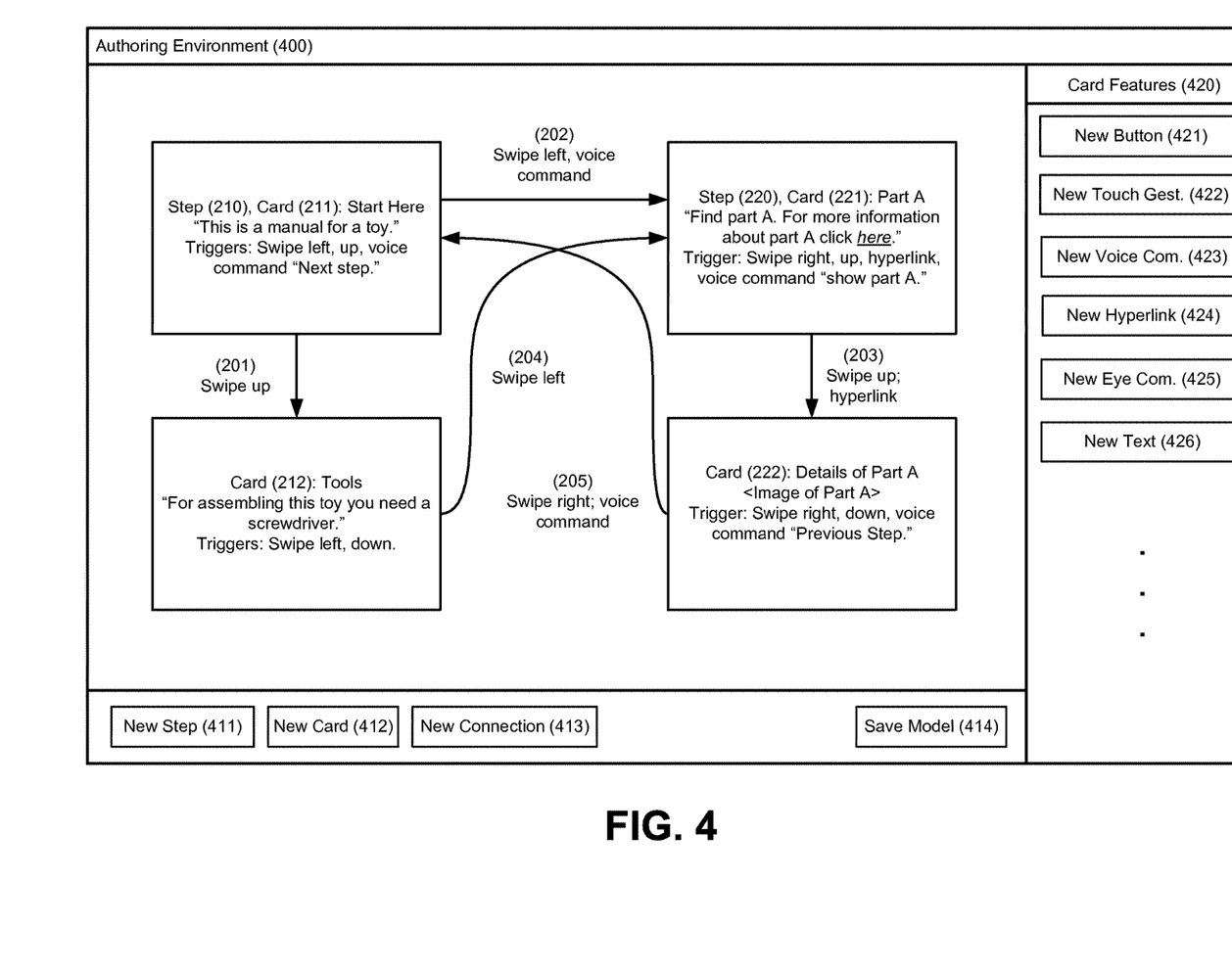
FIG. 4 illustrates an example embodiment of an authoring environment according to an example embodiment of the present invention.

FIG. 4 illustrates an example embodiment of an authoring environment. The authoring environment 400 can include several buttons such as a "New Step" button 411, a "New Card" button 412, and a "New Connection" button 413. Creating an instruction model includes defining various steps, cards, and connections between the cards. A modeler can create a new step by pressing the "New Step" button 411, in response to which the system displays in authoring environment 400 a representation of a new step data structure. Subsequent pressings of "New Step" button 411 can create steps which sequentially come after the first step. For example, the first time a modeler presses "New Step" button 411, step 210 will be created and the second time the modeler presses "New Step" button 411, step 220 will be created. However, the modeler can change this order and rearrange the steps as the modeler desires, e.g., by a drag-and-drop functionality.

By default, whenever a modeler creates a new step, the step has a card. A modeler can also create additional new cards by pressing "New Card" button 412 while a step is selected. In response to pressing the "New Card" button 412, a new card data structure is created and a representation of the new card is displayed under the selected step. Subsequent pressings of "New Card" button 412 can create cards which sequentially come after the first card of the step. For example, the modeler can select step 210 and press "New Card" button 412. Card 211 is already included in step 210 by default. As a result, card 212 will be created and displayed under step 210. The modeler can press "New Card" button 412 another time for creation and display of a representation of another card, which will be the third and last card in step 210. The modeler can change this order as the modeler desires. Each time a new card is created and displayed the modeler can be prompted to enter a title for the card, any text to be displayed in the card, etc. The modeler can enter this information when prompted, or can enter this information later on.

Using the card features column 420, a modeler can define various details for each card. A modeler can select one of the created cards and then press any of the following example buttons: "New Button" button 421, "New Touch Gest." button 422, "New Voice Com." button 423, "New Hyperlink" button 424, "New Eye Com." button 425, and "New Text" button 426. "New Button" button 421 creates a new button on the selected card. "New Touch Gest." button 422 creates a new touch gesture for the selected card. Authoring environment 400 can prompt the modeler to select the type of the touch gesture that the modeler intends to create on the selected card (e.g., touching, double touching, swiping, etc.). By pressing the "New Voice Com." button 423, the authoring environment 400 assists the modeler in creating a voice command. Authoring environment 400 can prompt the modeler to select the specific words which activate the voice command trigger. "New Hyperlink" button 424 creates a hyperlink trigger. The modeler, however, has to select a text in the card to create a hyperlink on the card. The hyperlink will be associated with the selected text. "New Eye Com." button 425 creates a new eye-tracking command. "New Text" button 426 allows the modeler to add text to the selected card.

When the modeler has defined a plurality of cards, the modeler can define respective connections between respective pairs of the plurality of cards. For example, in an embodiment, upon pressing the "New Connection" button 413, the modeler will be prompted to define the source card, destination card, and the trigger which will be associated with the connection. In an example embodiment, a modeler can use another graphical control to place an arrow connector between steps or between cards to generate a new connection. A modeler can select multiple triggers for a connection. For example, in an example embodiment, the modeler can interact with the authoring environment interface to add arrows between cards to define a connection between cards, and the sequence of the transition, with one of the cards being the source card and one of the cards being the destination card for each of the connections. The authoring environment displays the arrow between the source card and the destination card, and displays defined triggers. In example embodiment, the modeler can type in or drag various triggers into the connection.

After defining various steps, cards, connections between the cards, and associated triggers, the modeler can save the generated model by pressing the "Save Model" button 414. As a result an instruction model is generated, which is executable by an instruction application for display and navigation of screens corresponding to the cards of the generated model.

Figure 5:
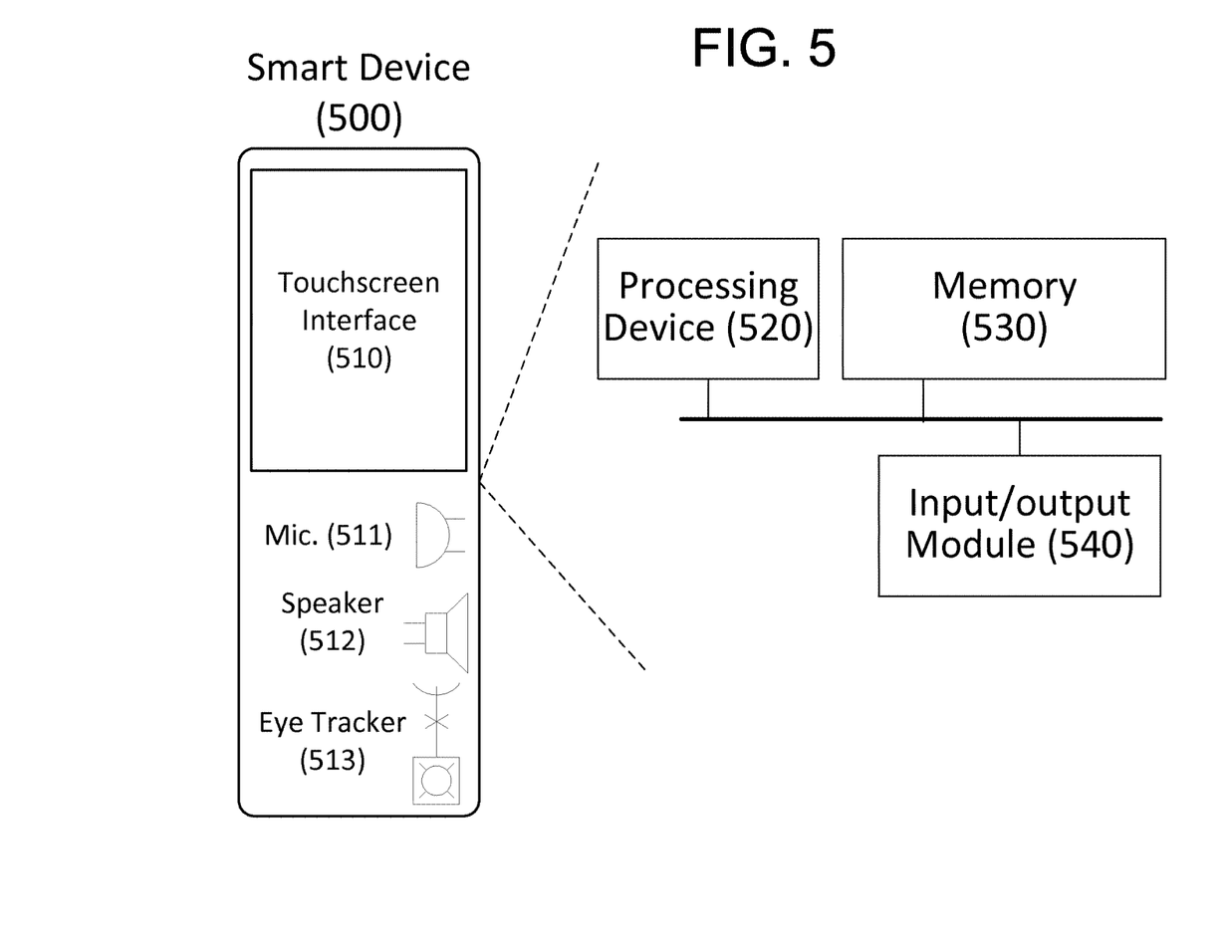
FIG. 5 illustrates a representative architecture of a smart device according to an example embodiment of the present invention.

FIG. 5 illustrates a representative architecture of a smart device (including wearable computing devices, mobile devices, and tablets) according to an example embodiment. A smart device 500 can include a touchscreen interface 510, a processing device 520, a memory 530, and input/output module 540.

The touchscreen interface 510 can include a display, which can be a touchscreen, capable of displaying data to a user of the smart device 500. Although not shown, the touchscreen interface 510 can include a touch sensor, e.g., a capacitive touch detection sensor, configured to detect and track movement on the surface and/or in the vicinity of the display. The sensor can be coupled to a signal processing circuit that is configured to identify, locate, and/or track object movement based on the data obtained from sensor.

Processing device 520 can perform computation and control functions of a system and comprises, e.g., a suitable central processing unit (CPU). Processing device 520 can include a single integrated circuit, such as a microprocessing device, or can include any suitable number of integrated circuit devices and/or circuit boards working in cooperation to accomplish the functions of a processing device. Processing device 520 can execute computer programs, such as object-oriented computer programs, within memory 530.

Memory 530 can include a non-transitory computer readable medium storing application modules, which can include instructions associated with applications and modules of the smart device 500. In an embodiment, memory 530 can contain different components for retrieving, presenting, changing, and saving data. Memory 530 can include a variety of memory devices, for example, Dynamic Random Access Memory (DRAM), Static RAM (SRAM), flash memory, cache memory, and other memory devices. Additionally, for example, memory 530 and processing device(s) 520 can be distributed across several different computers that collectively comprise a system. Memory 530 can be capable of storing user inputs and preferences as well as customized sequences.

The input/output module 540 manages the functionality of touchscreen interface 510 and other devices which provide output to the user or receive input from the user, such as microphone 511, speaker 512, and eye-tracker 513. For example, input/output module 540 can include functionality for identifying a touched point(s) within the application interface displaying an instruction. Commands indicating that the user intends to go to a different screen can be submitted using input devices such as touchscreen 510, microphone 511, and/or eye tracker 513. Input/output module 540 can include a voice recognition module, which recognizes speech, and an eye-tracking module, which recognizes eye movements.

An example embodiment of the present invention is directed to one or more processors, which can be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to one or more hardware computer-readable media, e.g., as described above, having stored thereon instructions executable by a processor to perform the methods described herein.

An example embodiment of the present invention is directed to a method, e.g., of a hardware component or machine, of transmitting instructions executable by a processor to perform the methods described herein.

The above description is intended to be illustrative, and not restrictive, and although the above description provides details for purposes of clarity of understanding, it will be apparent that certain changes and modifications may be practiced within the scope of the following claims. The invention is not to be limited to the details given herein, but may be modified within the scope and equivalents of the following claims. For example, those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims. For example, the present invention may be practiced according to the claims without some or all of these specific details. For the purpose of clarity, technical material that is known in the technical fields related to the invention has not been described in detail so that the present invention is not unnecessarily obscured.

What is claimed is:

1. A method for displaying electronic instructions to a user on a smart device including a touchscreen, the method comprising:
   storing in an electronically accessible storage device, an assignment of a plurality of instruction elements to a plurality of cards and an assignment of the plurality of cards to a plurality of steps, wherein:
     at least one card is assigned to each step, and one of the cards assigned to each step is a first card of the step;
     each card is defined to include at least one instruction element;
     each of the cards corresponds to a respective display screen that is displayable on a touchscreen of the smart device;
     the plurality of cards include (a) source cards and (b) target cards between which connections are defined in the storage device; and
     a sequence of connections is defined between the first cards of the plurality of steps;
   displaying, by the touchscreen of the smart device, the display screen corresponding to one of the source cards, including the at least one instruction element of the source card; and
   responsive to activation of at least one trigger by the user, and in accordance with the defined connection between the source card and one of the target cards, replacing in the touchscreen the display screen corresponding to the source card with the display screen corresponding to the target card and its included instruction elements.

2. The method of claim 1, wherein, except for the first card of a first step, there is a connection defined between the first card of every other step, as a source card, and the first card of its respective preceding step, as a target card, the touchscreen replaces a display screen corresponding to the source card with a display screen corresponding to the target card and its included instruction elements.

3. The method of claim 2, wherein there is a connection defined between every card in the every other step and the first card of its respective preceding step.

4. The method of claim 1, wherein, except for the first card of a last step, there is a connection defined between the first card of every other step, as a source card, and the first card of its respective following step, as a target card, the touchscreen replaces a display screen corresponding to the source card with a display screen corresponding to the target card and its included instruction elements.

5. The method of claim 4, wherein there is a connection defined between every card in the every other step and the first card of is respective following step.

6. The method of claim 1, wherein the at least one trigger includes at least one of a button, a hyperlink, a touch gesture, a voice command, and an eye-input command.

7. The method of claim 1, wherein the at least one trigger includes a touch gesture, the touch gesture including one of a tapping, a double tapping, a swiping, and a long pressing.

8. The method of claim 1, wherein the smart device is a wearable computing device.

9. A non-transitory computer-readable medium on which are stored instructions that are executable by a processor and that, when executed by the processor, cause the processor to perform a method, the method comprising:
   storing in an electronically accessible storage device, an assignment of a plurality of instruction elements to a plurality of cards and an assignment of the plurality of cards to a plurality of steps, wherein:
      at least one card is assigned to each step, and one of the cards assigned to each step is a first card of the step;
      each card is defined to include at least one instruction element;
      each of the cards corresponds to a respective display screen that is displayable on a touchscreen of the smart device;
      the plurality of cards include (a) source cards and (b) target cards between which connections are defined in the storage device; and
      a sequence of connections is defined between the first cards of the plurality of steps;
   displaying, by the touchscreen of the smart device, the display screen corresponding to one of the source cards, including the at least one instruction element of the source card; and
   responsive to activation of at least one trigger by the user, and in accordance with the defined connection between the source card and one of the target cards, replacing in the touchscreen the display screen corresponding to the source card with the display screen corresponding to the target card and its included instruction elements.

10. A method for generating electronic instructions in a user-interactable authoring environment provided by a computer processor, the method comprising:
   responsive to user-input authoring instructions, which are user input via a user interface of the authoring environment:
      generating, by the processor:
         (a) a plurality of steps;
         (b) a plurality of cards corresponding to respective display screens that include respective informational elements and that are displayable by a user interface device, and each card belonging to a respective one of the plurality of steps;
         (c) connections between respective pairs of the cards and respective pairs of the steps, each connected pair of steps including a respective source step and a respective target step, and each connected pair of cards including a respective source card and a respective target card; and
         (d) for each of the connections, a respective trigger for triggering the respective connection;
      displaying in a user interface of the authoring environment respective visual representations of the plurality of steps, the plurality of cards, and the connections, wherein the visual representations of the connections are respective edges drawn between the respective pairs of steps and cards between which the respective connections are defined; and
   generating code executable by a smart device for display of the screens in sequences corresponding to the defined connections and triggers, such that a triggered connection causes a transition from display of the display screen corresponding to the source of the triggered connection to display of the display screen corresponding to the target of the triggered connection.

11. A non-transitory computer-readable medium on which are stored instructions that are executable by a processor and that, when executed by the processor, cause the processor to perform a method for generating electronic instructions in a user-interactable authoring environment, the method comprising:
   responsive to user-input authoring instructions, which are user input via a user interface of the authoring environment:
      generating, by the processor:
         (a) a plurality of steps;
         (b) a plurality of cards corresponding to respective display screens that include respective informational elements and that are displayable by a user interface device, and each card belonging to a respective one of the plurality of steps;
         (c) connections between respective pairs of the cards and respective pairs of the steps, each connected pair of steps including a respective source step and a respective target step, and each connected pair of cards including a respective source card and a respective target card; and
         (d) for each of the connections, a respective trigger for triggering the respective connection;
      displaying in a user interface of the authoring environment respective visual representations of the plurality of steps, the plurality of cards, and the connections, wherein the visual representations of the connections are respective edges drawn between the respective pairs of steps and cards between which the respective connections are defined; and
   generating code executable by a smart device for display of the screens in sequences corresponding to the defined connections and triggers, such that a triggered connection causes a transition from display of the display screen corresponding to the source of the triggered connection to display of the display screen corresponding to the target of the triggered connection.

\* \* \* \* \*